United States Patent [19]
Osborne et al.

[11] Patent Number: 5,510,670
[45] Date of Patent: Apr. 23, 1996

[54] ELECTRON BEAM DEVICE HAVING A GLASS ENVELOPE AND A FOCUSSING LENS PROVIDED THEREON

[75] Inventors: William N. Osborne, Ringwood, N.J.; Petrus J. M. Prinsen; Edwin A. Montie, both of Eindhoven, Netherlands

[73] Assignee: Philips Electronics North American Corporation, New York, N.Y.

[21] Appl. No.: 277,446

[22] Filed: Jul. 19, 1994

[51] Int. Cl.⁶ .................................................. H01J 29/46
[52] U.S. Cl. .......................... 313/450; 313/479; 313/452
[58] Field of Search .................................. 313/445, 450, 313/479, 452, 432, 439; 315/3

[56] References Cited

U.S. PATENT DOCUMENTS

| | | | |
|---|---|---|---|
| 4,713,879 | 12/1987 | Vrijssen | 313/450 |
| 4,827,184 | 5/1989 | Spanjer et al. | 313/432 |
| 4,853,589 | 8/1989 | Vrijssen | 313/450 |
| 4,857,797 | 8/1989 | Vrijssen et al. | 313/479 |

*Primary Examiner*—Donald J. Yusko
*Assistant Examiner*—Nimesh D. Patel
*Attorney, Agent, or Firm*—Norman N. Spain

[57] ABSTRACT

A focussing lens for an electron beam device is formed by a helically coiled resistance layer of a fired suspension of a conductive material of a mixture of a lead rathenate, a lead titanate and a ruthenium oxide in a glass formed of silicon dioxide, aluminum oxide and lead oxide.

9 Claims, 1 Drawing Sheet

ELECTRON BEAM DEVICE HAVING A GLASS ENVELOPE AND A FOCUSSING LENS PROVIDED THEREON

BACKGROUND OF THE INVENTION

The invention relates to an electron beam device such as a cathode ray tube having an electron gun, a focussing lens for focussing the electron beam produced by the electron gun on a desired spot on a surface and a glass envelope provided around a central axis of the electron gun.

More particularly, the invention relates to such a device in which the focussing lens is in the form of a helically coiled resistance layer provided on the inner surface of the glass envelope.

Such electron beam devices are well known in the art and are described in, for example, Vrijssen, U.S. Pat. No. 4,713,879, Spanjer et al U.S. Pat. No. 4,827,184 and Vrijssen et al U.S. Pat. No. 4,857,797.

While the performances of these devices have been proved to be satisfactory, it has been found that the reproducibility of these devices, particularly of the focussing lens, is not completely satisfactory. Thus it has been found that in a series of cathode ray tubes manufactured to the same specifications undesired variations occur in helically coiled resistance layers.

In addition it has been found that the resistance layers are insufficiently homogeneous and frequently exhibit undesirably high temperature coefficients of resistance.

SUMMARY OF THE INVENTION

A principal object of the invention is to provide an electron beam device of the type described in which the reproducibility of the focussing lenses is significantly improved. Further objects of the invention are to provide resistance layers for the focussing lenses that are homogeneous and exhibit relatively low temperature coefficients of resistance. These and other objects of the invention will be apparent from the description that follows.

According to the invention a new and improved electron beam device is provided in which the focussing lens is a helically coiled resistance layer formed, on the inner surface of a glass member surrounding a central axis of the electron gun of the device, from a coating provided on that surface from about 50%–67% by weight of a glass comprising, by weight, about 30%–40% of $SiO_2$, about 3%–7.5% of $Al_2O_3$ and about 53%–67% of PbO containing in suspension about 33%–50% of a conductive material comprising, by weight, about 45%–60% of lead ruthenate, about 25%–38% of a lead titanate and about 2%–15% of a ruthenium oxide.

BRIEF DESCRIPTION OF THE DRAWING

The sole FIGURE of the drawing is a diagrammatic cross-sectional view of a cathode ray tube of the invention.

DETAILED DESCRIPTION OF THE INVENTION

Figure 1:
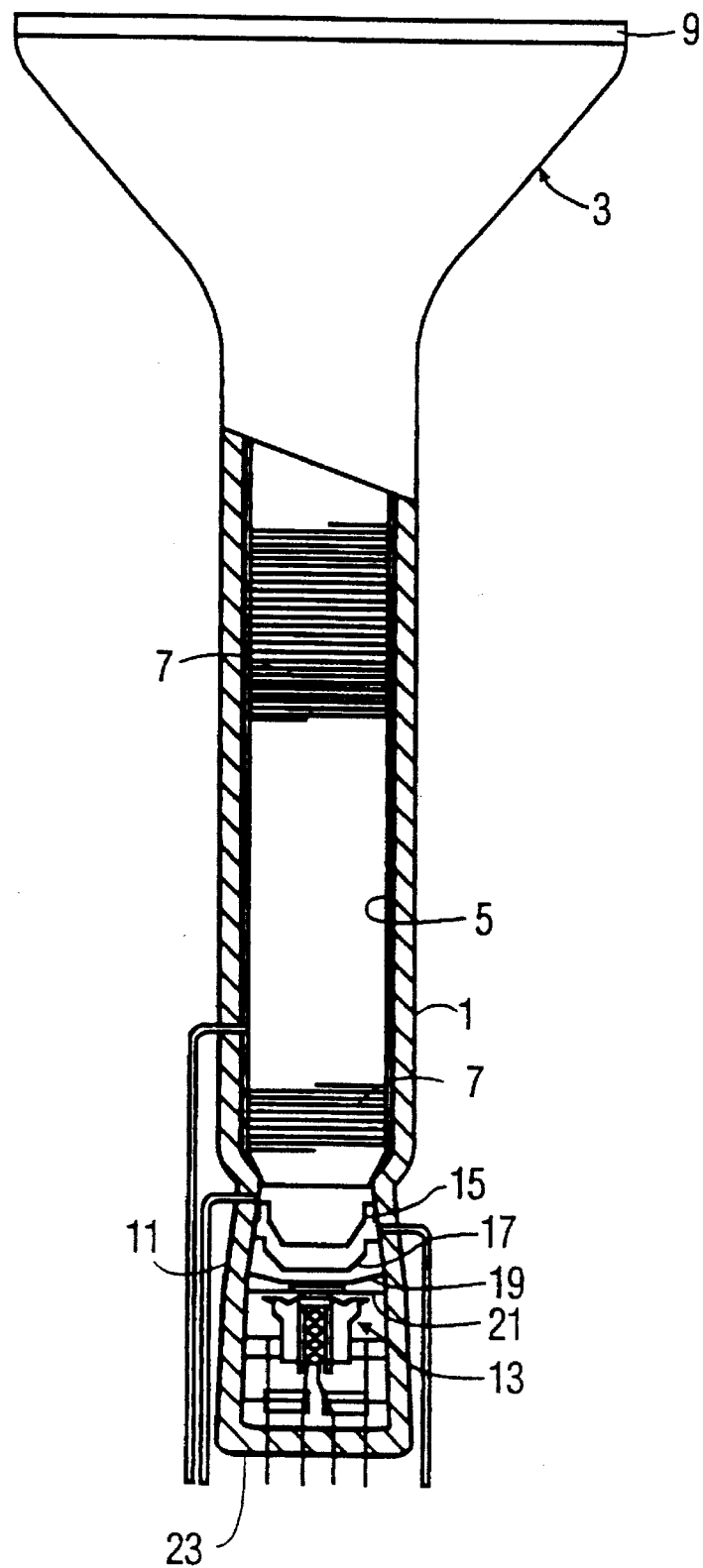

Various electron beam devices such as cathode ray tubes and x-ray tubes may employ the instant invention. However, the instant invention is particularly useful in cathode ray tubes. That is because, among other reasons, due to the large number of cathode ray tubes produced to a single specification at a particular factory it is important from an economic point of view that the number of cathode ray tubes not meeting the specification and thus being unsuitable for marketing be reduced to an absolute minimum. Thus the reproducibility of the focussing lenses, essential components of cathode ray tubes, should be as high as possible.

The thickness of the coating provided on the inner surface of the neck of the cathode ray tube is preferably 3 μm.

Preferably in the coating the glass and the conductive material are present in a weight ratio of about 1.3–1.7:1.

While all lead ruthenates, lead titenates and ruthenium oxides are useful, it has been found that particularly good results are achieved when the lead ruthenate is $Pb_2Ru_2O_{6.5}$, the lead titanate is $PbTiO_3$ and the ruthenium oxide is $RuO_2$.

Preferably the glass present in the suspension consists essentially of 57%–61% of PbO, 34%–37% of $SiO_2$ and 3%–5% of $Al_2O_3$ and the conductive material present in the suspension consists essentially of 48%–51% of $Pb_2Ru_2O_{6.5}$, 34%–37% of $PbTiO_3$ and 14%–15% of $RuO_2$, all by weight.

The coating is preferably applied from a suspension of the constituents of the glass material and the conductive material in a liquid organic non-acidic suspending medium having a boiling point of less that 150° C. The pH of the suspension may be in the range of 8–10.

As the suspending agent a monohydroxy aliphatic alcohol of 1–5 carbons may be used. Of these, isopropanol is particularly useful.

While the pH of the suspension may be in the range of 8–10, it preferably is about 8 since at this pH the optimum degree of dispersion of the solids in the liquid suspending agent is achieved. Preferably the pH is achieved by the addition of ammonium hydroxide. However other liquid alkaline materials such as low molecular weight aliphatic amines, for example, dimethylamine, ethylamine and n-propyl amine may also be used.

The total weight percentage of the solids in the suspension is preferably about 40% and the particle size range of the solids is preferably about 1–3 μm, since at this concentration of solids and particle size range optimum coverage of the glass surface by the solids in the suspension is achieved.

The suspension may be applied to the inner surface of the glass envelope by methods well known in the art, for example by flow coating or by suction of the suspension vertically into the envelope.

After heating at a temperature of 30° C. to 35° C. to remove the liquid suspending agent, the resultant coating of solids is fired at a temperature of 700° C.–900° C. and preferably of 800° C.–900° C. in an oxygen containing atmosphere to cause the solids to form a uniform layer tightly bonded to the glass surface.

The coating is given the desired helical configuration by mechanical means such as by a stylus before firing or by means of a laser after firing.

Preferably the softening point of the glass envelope should not be lower than the highest firing temperature employed, thus preferably not lower than 850° C.

For a more complete understanding of the invention the invention will now be described in greater detail with reference to the figure of the drawing and the following example.

EXAMPLE 50 g of a glass frit of the composition 60% PbO, 35% $SiO_2$ and 5% $Al_2O_3$ were dispersed in about 150 grams of isopropanol. The resultant suspension was milled in a ball mill for about 8 hours until the largest particle size present in this suspension of glass-like material was not greater than 3 μm.

36 g of a conductive material consisting of about 50% of $Pb_2Ru_2O_{6.5}$, 35% $PbTiO_3$ and 15% $RuO_2$ was added to the suspension of the glass particles. The resultant mixture was then milled in a mill for a period of about 16 hours until the largest particle size was not greater than about 2 μm. This suspension was then sieved over a 11 μm sieve.

A coating composition was then prepared from the sieved solution by forming a suspension containing about 40 grams of solids in about 80 cc of isopropanol to which sufficient $NH_4OH$ was added to provide a pH of about 8.

Referring to the sole figure of the drawing a small amount of the coating composition was sucked up inside the neck 1 of a glass cathode ray tube envelope 3 formed of a glass having a softening pint of about 925° C. As a result a layer 5 of powder was provided on the inside of the neck 1. The layer was then dried with a stream of nitrogen.

By applying a steel stylus to the coating while turning the envelope helically coiled focussing lenses 7 were formed. The envelope was then fired at a temperature of about 840° C. for about 15 minutes.

In a similar manner a total of 12 cathode ray tube envelopes provided with similar focussing lenses were formed. The resistances of these focussing lenses were found to lie between 65 and 84 GOhm. The focussing voltages (Vfoc) of these envelopes provided with the focussing lenses ranged from 7613V to 7704V with a Vfoc average of 7656V and a standard deviation of 31V.

The standard deviation of the sheet resistance of these envelopes was 3.3%. In comparison the standard direction of the Vfoc of envelope produced with focussing lenses according to a prior art method was 300–400V and the standard deviation of the sheet resistance was 20%.

In a well known manner a screen 9 and an electron gun 11 are then provided in the envelope. The electron gun comprises a cathode 13 and electrodes 15, 17, 19 and 21. The envelope is then close by plate 23 through which connecting wires of the cathode 1 are led. The envelope is then evacuated through an opening (not shown) in the plate 23 and the opening was then sealed.

We claim:

1. A cathode ray tube comprising a glass envelope consisting of a display window, a cone and a neck and an electron gun situated inside said envelope opposite said window and having at least one focussing lens provided on an inside surface of said neck, the improvement wherein said at least one focussing lens is a helically coiled resistance layer formed of a suspension, by weight, of about 33%–50% of a conductive material comprising about 40%–60% of a lead ruthenate, about 25%–38% of a lead titanate and about 2%–15% of a ruthenium oxide in about 50%–67% of a glass comprising about 30%–40% of $SiO_2$, about 3%–7.5% of $Al_2O_3$ and about 53%–67% of PbO provided on said surface.

2. The cathode ray tube of claim 1, wherein the glass envelope has a softening point of greater than 850° C.

3. The cathode ray tube of claim 2, wherein the glass and the conductive material are present in the suspension in a weight ratio of about 2:1.

4. The cathode ray tube of claim 2, wherein the lead ruthenate is $Pb_2Ru_2O_{6.5}$, the lead titanate is $PbTiO_3$ and ruthenium oxide is $RuO_2$.

5. The cathode ray tube of claim 4, wherein the glass present in the suspension consists essentially of 57%–61% by weight of PbO, 34%–37% of $SiO_2$ and 3%–5% of $Al_2O_3$ and the conductive material present in the suspension consists essentially of 48%–51% by weight of $Pb_2Ru_2O_{6.5}$, 34%–37% of $PbTiO_3$ and 14%–15% of $RuO_2$.

6. An electron beam device including an electron gun comprising electron-beam means for producing an electron beam directed to a surface and focusing means for producing a focusing lens field for focusing said electron beam to a spot on said surface, said focusing means comprising;

an elongated tubular glass member positioned around a central axis of said electron gun, said tubular glass member being provided on an inner surface thereof with at least one focusing lens, said at least one focusing lens being a helically coiled resistance layer formed of a suspension, by weight, of about 33%–50% of a conductive material comprising about 40%–60% of a lead ruthenate, about 25%–38% of a lead titanate and about 2%–15% of a ruthenium oxide in about 50%–67% of a glass comprising about 30%–40% of $SiO_2$, about 3%–7.5% of $Al_2O_3$ and about 53%–67% of PbO provided on said surface.

7. The electron beam device of claim 6, wherein the glass member has a softening point of greater than 850° C.

8. The electron beam device of claim 7, wherein the lead ruthenate is $Pb_2Ru_2O_{6.5}$, the lead titanate is $PbTiO_3$, the ruthenium oxide is $RuO_2$ and the coating is fired at a temperature of 800°– 900° C.

9. The electron beam device of claim 8, wherein the glass present in the suspension comprises, by weight, about 34–37% of $SiO_2$, 57–61% of PbO and 3%–5% of $Al_2O_3$ and the conductive material present in the suspension comprises, by weight, 48%–51% of $Pb_2Ru_2O_{6.5}$, 34%–37% of $PbTiO_3$ and 14%–15% of $RuO_2$.

* * * * *